(12) United States Patent
Adelmann

(10) Patent No.: US 6,644,556 B2
(45) Date of Patent: Nov. 11, 2003

(54) STORAGE DEVICE INCLUDING STORAGE SPACE INDICATION

(75) Inventor: Todd Christopher Adelmann, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/052,098

(22) Filed: Jan. 18, 2002

(65) Prior Publication Data

US 2003/0136849 A1 Jul. 24, 2003

(51) Int. Cl.[7] ............................................... G06K 19/06
(52) U.S. Cl. ....................................... 235/492; 235/487
(58) Field of Search .................................. 235/487, 492

(56) References Cited

U.S. PATENT DOCUMENTS 4,797,542 A * 1/1989 Hara ........................... 235/492
5,745,102 A    4/1998 Bloch et al.

* cited by examiner

*Primary Examiner*—Harold I. Pitts

(57) ABSTRACT

The present disclosure relates to a storage device. In one arrangement, the storage device comprises a memory module, a controller, and a storage space indicator that conveys an indication of the amount of storage space that is available. In some arrangements, the storage space indicator comprises a nonvolatile display.

33 Claims, 3 Drawing Sheets

STORAGE DEVICE INCLUDING STORAGE SPACE INDICATION

FIELD OF THE INVENTION

The present disclosure relates to a storage device including storage space indication. More particularly, the present disclosure relates to a storage device that includes a nonvolatile display that indicates how much storage space is available within the storage device.

BACKGROUND OF THE INVENTION

Many current electronic devices such as notebook computers, personal digital assistants (PDAs), digital cameras, etc. employ removable storage devices that can be used to store various different types of data. For instance, many such electronic devices are configured to receive flash memory cards.

Although providing greater flexibility for the user, such removable storage devices have somewhat limited storage capacities. Therefore, it is common for a user to possess several different interchangeable, removable storage devices for one or more electronic devices. Because of this fact, the user may have several different storage devices stored outside of an electrical device, e.g., in miniature jewel boxes.

Over time, the user can easily forget how much space remains on each of his or her removable storage devices. Unfortunately, since the storage devices do not comprise any form of storage space indicator, the only way to determine how much space is available is to activate the electrical device with which the storage device is used, insert the storage device into an appropriate slot, and determine the amount of space from a gauge, for instance shown to the user on a display of the electrical device.

Although capacity indicators have been provided for other devices, e.g., battery life indicators of batteries, no such indicators have been developed for storage devices because such storage devices typically do not include their own internal power supply.

From the foregoing, it can be appreciated that it would be desirable to have a storage device that indicates the amount of storage space that is available for storing data.

SUMMARY OF THE INVENTION

The present disclosure relates to a storage device. In one arrangement, the storage device comprises a memory module, a controller, and a storage space indicator that conveys an indication of the amount of storage space that is available. In some arrangements, the storage space indicator comprises a nonvolatile display.

The present disclosure also relates to a method for indicating the amount of storage space available from a storage device. In one arrangement, the method comprises the steps of determining the amount of storage space that is available in at least one memory module, and updating a nonvolatile display of the storage device so that it conveys the amount of available space.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Disclosed herein is a storage device that provides an indication as to the amount of storage space that remains available. To facilitate description of the inventive device, an example device is discussed with reference to the figures. Although this device is described in detail, it will be appreciated that this device is provided for purposes of illustration only and that various modifications are feasible without departing from the inventive concept. After the example device has been described, an example of operation of the device will be provided to explain the manner in which the device can be used to provide storage space indication.

Figure 1:
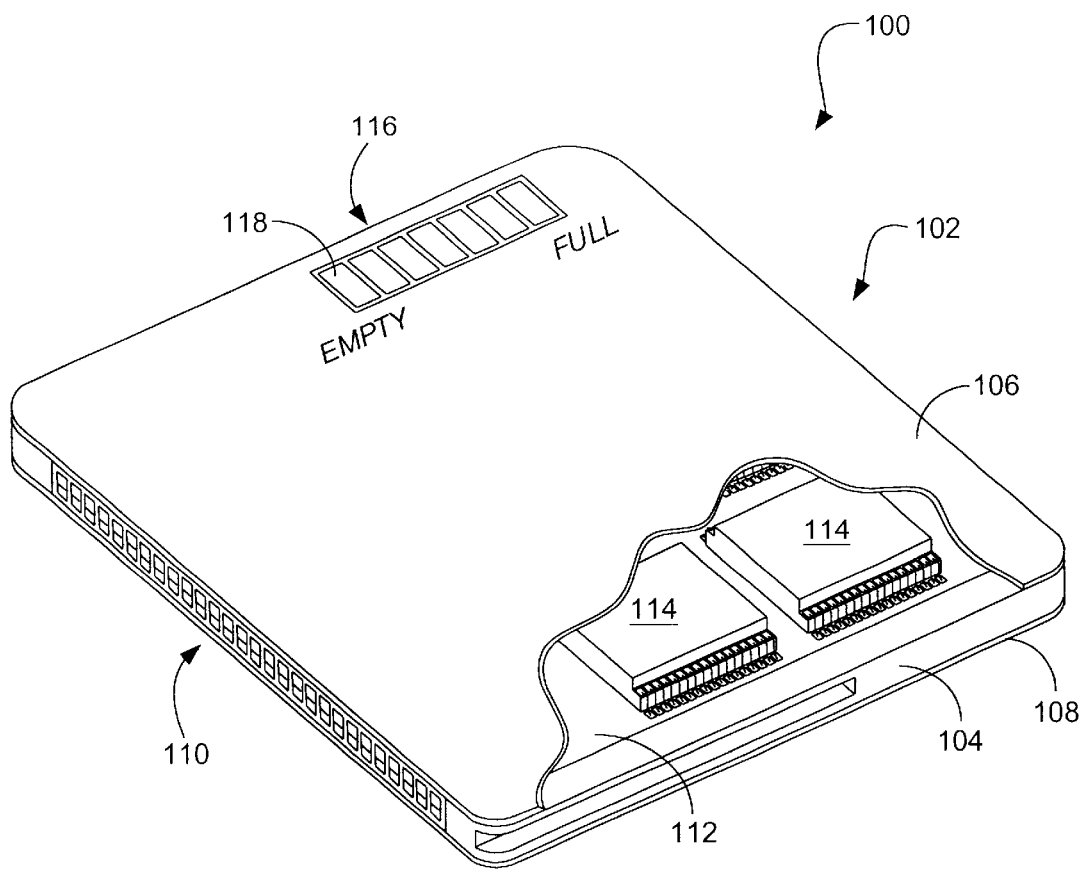
FIG. 1 is a perspective view of an example storage device that includes a storage space indicator.

Referring now in more detail to the drawings, in which like numerals indicate corresponding parts throughout the several views, FIG. 1 illustrates a storage device 100 that can be used to store various data. Byway of example, the storage device 100 can be similar in size and configuration to a conventional flash memory card. For instance, the storage device 100 can have width, length, and thickness dimensions of approximately 1.75 in, 1.5 in, and 0.125 in, respectively.

The storage device 100 typically comprises a housing 102 that, for example, can comprise a frame 104, and two opposed covers 106 and 108. Normally, the frame 104 includes a connector 110 with which electrical communication can be established with the storage device 100. Although a particular type of housing and a particular connector 110 are shown in FIG. 1 for purposes of illustration, it is to be noted that alternative arrangements are feasible.

Typically disposed within the housing 102 is a printed circuit board (PCB) 112 that is electrically connected to one or more memory modules 114. Normally, the memory modules 114 are surface mounted to the PCB 112 and electrically connected thereto such that each memory module is in electrical communication with the other memory modules on the board to provide storage redundancy. Each of the memory modules 114 typically is extremely small in size so that a plurality of such devices can be provided within the housing 102. By way of example, the memory modules can comprise flash memory modules, atomic resolution storage (ARS) devices, or magnetic random access memory (MRAM) devices. Example ARS and MRAM devices are described in U.S. patent application Ser. No. 09/802,345, filed March 9, 2001, which is hereby incorporated by reference into the present disclosure.

In addition to the features identified above, the storage device 100 further comprises a storage space indicator 116 that, for instance, is formed within or is mounted to the housing 102. Although shown in a particular location on the housing 102, persons having ordinary skill in the art will appreciate that the location of the indicator 116 could be changed (e.g., through redesign) if desired. Preferably, the indicator 116 comprises a nonvolatile display such that the amount of storage space that remains on the device 100 can be indicated even when no power is supplied to the device. As is identified in FIG. 1, the indicator 116 can take the form of a graphical gauge that conveys how close the storage device is to being "empty" or "full." This can be accomplished with several bars 118 that are activated (e.g., darkened) in sequence. Although illustrated in this manner, persons having ordinary skill in the art will appreciate that the indicator 116 can indicate the amount of available storage space in other ways, for instance, by providing an indication of the number of bytes that are free for storing new data.

Figure 2:
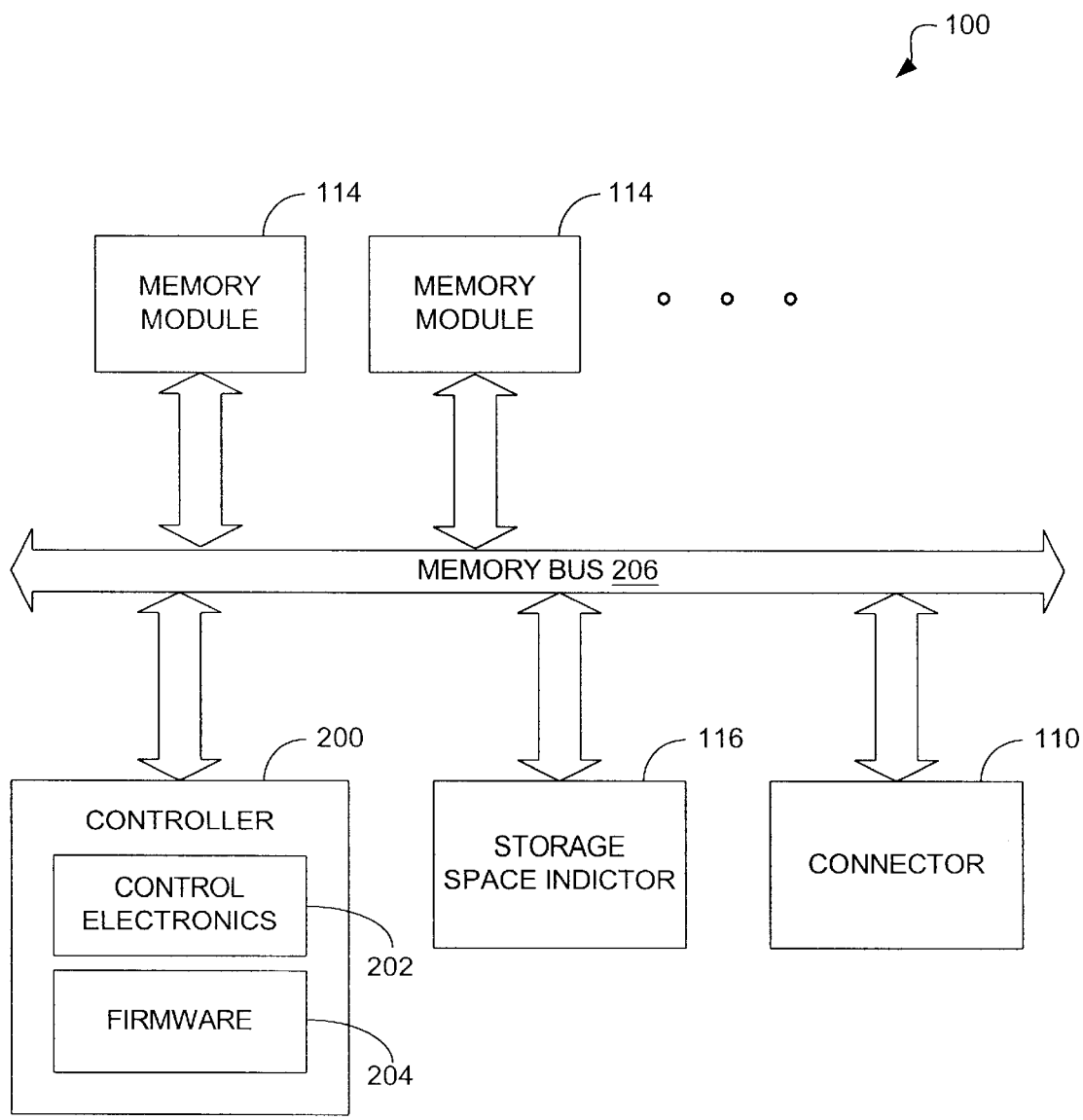
FIG. 2 is a schematic block diagram of the storage device shown in FIG. 1.

FIG. 2 schematically illustrates an example architecture for the storage device 100. As indicated in this figure, the storage device 100 further includes at least one controller 200 that typically comprises a semiconductor device that is electrically connected to the memory modules 114 through the PCB 112 (FIG. 1). By way of example, the controller 200 can comprise an integrated circuit (IC) that includes control electronics 202 and firmware 204 that together are used to interface with the memory modules 114 and a host electrical device (e.g., notebook computer, PDA, digital camera, etc.). Normally, the connector 110, memory modules 114, storage space indicator 116, and controller 200 are connected to a memory bus 206 that is formed within the PCB 112 (FIG. 1).

As identified above, the storage space indicator 116 preferably comprises a nonvolatile display such that the available storage space can be indicated even when power is not provided to the storage device 100. Several different nonvolatile displays are suitable for the construction of the storage space indicator 116. By way of example, the storage space indicator 116 can comprise a cholesteric liquid crystal display (LCD). As is known in the display arts, cholesteric LCDs are reflective LCDs that comprise pixels that are stable in two states (i.e., that are bistable): a planar state in which incident rays are reflected and a focal conic state in which indicated rays are transmitted and absorbed by a non-reflective coating of the LCD and/or scattered by the LCD. In the planar state, a pixel appears bright. In the focal conic state, however, the pixel appears dark, thereby providing adequate contrast to convey information to a user.

Although an electrical voltage is required to switch pixels of a cholesteric LCD from one state to another, no power is needed to maintain a current state of the pixels. Accordingly, once the amount of memory is noted in the indicator 116 (e.g., while the storage device 100 is powered by a host electrical device) the indicator will display an indication of the amount of storage space available indefinitely, even when not powered by another device (e.g., after being removed from the host electrical device). Suitable cholesteric LCDs may be obtainable using techniques developed by Kent Displays, Inc. of Kent, Ohio.

In another arrangement, the storage space indicator 116 can comprise a zenithal bistable display (ZBD). As is known in the display arts, ZBDs incorporate carefully designed grating surfaces that induce two different orientations of liquid crystal molecules: parallel and perpendicular to the surface. By adjusting the orientation (i.e., "pinning") of the molecules, two different stable states (light and dark) can be induced to provide the contrast needed to convey information to the user. Normally, the grating surface of a ZBD comprises a micro-grooved surface fabricated using photolithographic techniques. The state of any given pixel can be switched by applying an appropriate electric field (i.e., applied voltage) to the pixel. Once placed in a particular state, however, the pixel will remain in that state even after the electric field is removed. Suitable ZBDs may be obtainable using techniques developed by ZBD Displays Ltd. of Malvern, UK.

In addition to the above-noted nonvolatile display technologies, various technologies currently being developed for so-called electronic books can also be used for the construction of the storage space indicator 116. For example, the indicator 116 may be arranged as a rotating ball display such as those currently being developed by Gyricon Media of Palo Alto, Calif. This technology incorporates a plurality of microscopic beads (e.g., 100 μm in diameter) suspended in oil and sandwiched between two thin sheets of material such as a plastic. Each of the beads has a light (reflective) hemisphere and an opposed dark (absorptive) hemisphere. When exposed to an appropriate charge, the beads can be controlled to rotate such that the color seen by the viewer changes from light to dark or vice versa. Because the balls and the oil substrate have nearly matched specific gravities, the balls do not easily move once positioned by an electric field. Accordingly, like the other technologies described above, information can be accurately conveyed even after power is removed.

Another possible technology that may be suitable for construction of the storage space indicator 116 is so-called electrophoretic ink, also known as e ink, which is currently being developed by E ink Incorporated of Cambridge, Mass. This technology uses microscopic, transparent spheres that, like the rotating balls described above, are sandwiched between two sheets of material. The spheres contain positively charged (e.g., white) and negatively charged (e.g., black) pigment chips. The positions of the chips within the spheres can be changed by the application of an appropriate voltage such that the spheres can appear light or dark to the viewer. Again, bistable operation is provided in that neither state requires power to be maintained.

Figure 3:
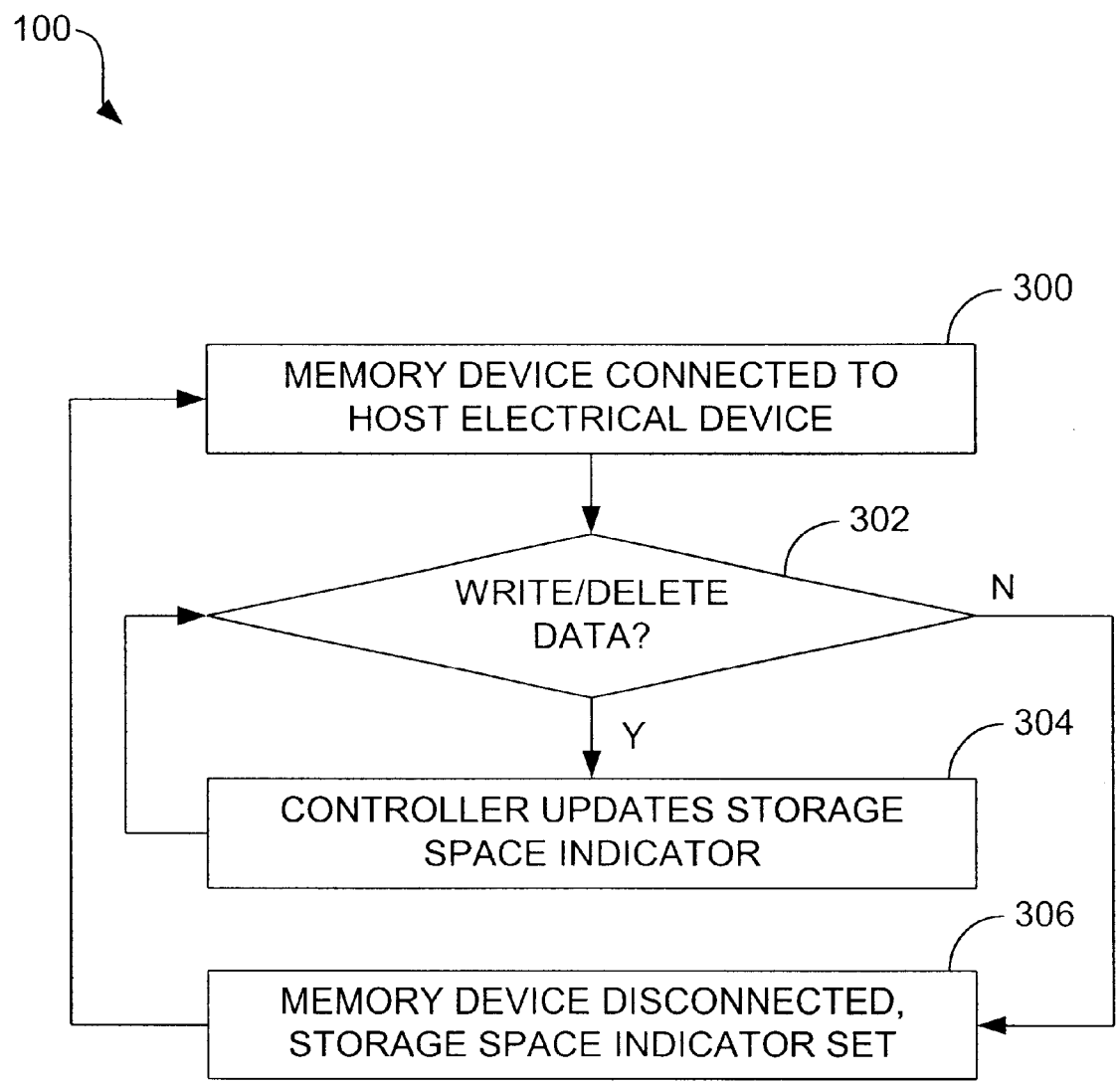
FIG. 3 is a flow diagram illustrating an example of the manner with which the storage device shown in FIGS. 1 and 2 can be operated.

FIG. 3 provides an example of the manner in which the storage device 100 can be used to convey storage space information to a user. As identified in block 300, the storage device 100 is connected to a host electrical device such that the storage device is powered and available for writing and reading of data. As mentioned above, the nature of this data typically depends upon the nature of the host electrical device. By way of example, this data can comprise text and/or images. With reference to decision element 302, when data are written to or deleted from the storage device 100, i.e. one or more memory modules 114 under the control of the controller 200, the controller updates the storage space indicator 116, as indicated in block 304, so that the indicator conveys accurate, up to date information about the amount of space that is available within the storage device 100 for storing data. As is known in the art, the controller 200 is capable of updating the indicator 116, ie. controlling the state of the indicator, in this manner in that the controller regularly determines how much storage space is available.

With reference back to decision element 302, if no more data are to be written or deleted, the storage device 100 can be disconnected from the host electrical device, as indicated in block 306. This disconnection may, for instance, comprise removal of the storage device 100 from a card slot of the host electrical device. Once disconnected, the storage space indicator is set. Stated in other words, in that the storage space indicator 116 is nonvolatile, it continues to indicate the last updated available space indication set by the controller 200 even though no more power is provided to the storage device 100. This indication will be static until such time when, returning to block 300, the storage device 100 is reconnected to (e.g., reinserted into) the host electrical device.

With the storage device 100 operating in the manner described above, users can determine the amount of memory space that is available within the storage device even when the storage device has been disconnected from a host electrical device or other power source for days, weeks, or years.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A removable storage device, comprising:

a memory module;

a controller; and a storage space indicator that conveys an indication of the amount of storage space that is available.

2. The device of claim 1, wherein the storage device comprises a nonvolatile storage device.

3. The device of claim 1, wherein the storage device comprises a memory card.

4. The device of claim 1, wherein the memory module comprises a flash memory module.

5. The device of claim 1, wherein the memory module comprises an atomic resolution storage (ARS) device.

6. The device of claim 1, wherein the memory module comprises a magnetic random access memory (MRAM) device.

7. The device of claim 1, wherein the storage space indicator comprises a display.

8. The device of claim 7, wherein the display is nonvolatile.

9. The device of claim 8, wherein the display is a cholesteric liquid crystal display.

10. The device of claim 8, wherein the display is a zenithal bistable display.

11. The device of claim 8, wherein the display is a rotating ball display.

12. The device of claim 8, wherein the display is an electrophoretic ink display.

13. A removable, nonvolatile memory card, comprising:

at least one memory module;

a card controller; and a nonvolatile storage space display provided on the exterior of the memory card that indicates the amount of storage space that is available.

14. The memory card of claim 13, wherein the at least one memory module comprises a flash memory module.

15. The memory card of claim 13, wherein the at least one memory module comprises an atomic resolution storage (ARS) device.

16. The memory card of claim 13, wherein the at least one memory module comprises a magnetic random access memory (MRAM) device.

17. The memory card of claim 13, wherein the display is a cholesteric liquid crystal display.

18. The memory card of claim 13, wherein the display is a zenithal bistable display.

19. The memory card of claim 13, wherein the display is a rotating ball display.

20. The memory card of claim 13, wherein the display is an electrophoretic ink display.

21. A method for indicating the amount of storage space available from a storage device, comprising the steps of:

determining the amount of storage space that is available in at least one memory module;

updating a nonvolatile display of the storage device so that it conveys the amount of available space.

22. The method of claim 21, wherein the step of updating a nonvolatile display comprises updating a cholesteric liquid crystal display.

23. The method of claim 21, wherein the step of updating a nonvolatile display comprises updating a zenithal bistable display.

24. The method of claim 21, wherein the step of updating a nonvolatile display comprises updating a rotating ball display.

25. The method of claim 22, wherein the step of updating a nonvolatile display comprises updating an electrophoretic ink display.

26. A removable, nonvolatile memory card, comprising:

a plurality of flash memory modules;

a card controller comprising control electronics and firmware;

a connector configured to connect the memory card to another device; and a cholesteric liquid crystal display provided on the exterior of the memory card that indicates the amount of storage space that is available.

27. A removable, nonvolatile memory card, comprising:

a plurality of flash memory modules;

a card controller comprising control electronics and firmware;

a connector configured to connect the memory card to another device; and a zenithal bistable display provided on the exterior of the memory card that indicates the amount of storage space that is available.

28. A storage space indicator adapted for use with a removable storage device, the indicator being configured to display a storage capacity of the storage device when no power is supplied to the indicator.

29. The indicator of claim 28, wherein the indicator comprises a nonvolatile display.

30. The indicator of claim 29, wherein the display is a cholesteric liquid crystal display.

31. The indicator of claim 29, wherein the display is a zenithal bistable display.

32. The indicator of claim 29, wherein the display is a rotating ball display.

33. The indicator of claim 29, wherein the display is an electrophoretic ink display.

* * * * *